United States Patent [19]

Farooque et al.

[11] Patent Number: 4,713,303
[45] Date of Patent: Dec. 15, 1987

[54] FUEL CELL APPARATUS WITH RAPID START-UP

[75] Inventors: Mohammad Farooque, Huntington; Lawrence J. Novacco, Brookfield, both of Conn.

[73] Assignee: Energy Research Corporation, Danbury, Conn.

[21] Appl. No.: 17,356

[22] Filed: Feb. 24, 1987

[51] Int. Cl.⁴ ............................................. H01M 8/04
[52] U.S. Cl. ...................................... 429/26; 429/34; 429/17
[58] Field of Search ...................... 429/13, 17, 26, 34, 429/72, 19, 120, 20

[56] References Cited

U.S. PATENT DOCUMENTS 4,310,604 1/1982 Marchetti .............................. 429/17
4,680,240 7/1987 Furukawa et al. ................... 429/13

OTHER PUBLICATIONS

Article, Transportable Fuel Cell Powerplant, Abens and Farooque, International Communications Energy Conference, pp. 428-433, (1984).
Article, Small Methanol Powerplant Progress, Abens, Farooque and Schneider, National Fuel Cell Seminar, Programs and Abstracts, pp. 111-114, (1983).

Primary Examiner—Anthony Skapars
Attorney, Agent, or Firm—John J. Torrente

[57] ABSTRACT

Fuel cell apparatus with for rapid start-up is realized by including in the stack cooling/heating loop a burner which is situated downstream of the loop blower and by further situating the entry port for replenishing gas to the loop upstream of the blower.

8 Claims, 1 Drawing Figure

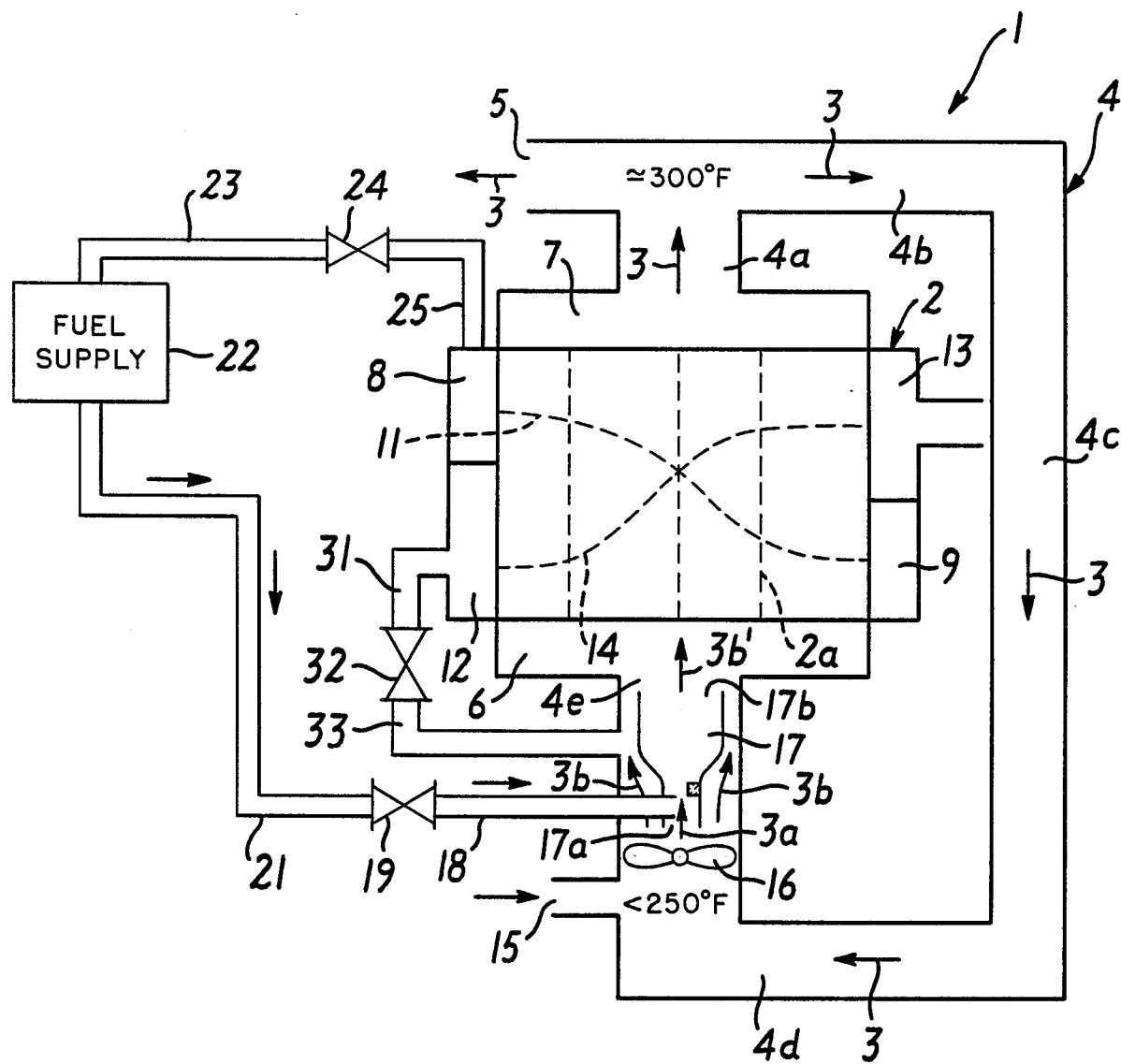

FUEL CELL APPARATUS WITH RAPID START-UP

BACKGROUND OF THE INVENTION

This invention relates to fuel cell power plants and, in particular, to practices for achieving rapid start-up time of such power plants.

In fuel cell power plants, and, in particular, in power plants designed to be transportable, it is desirable that the power plant have a relatively rapid start-up. In present state-of-the-art power plants the factor which limits start-up time is the time it takes to preheat the fuel cell stack.

In these state-of-the-art systems, one way of preheating the fuel cell stack is to provide an external burner in the path of the air provided to replenish the air in the stack cooling/heating loop. During start-up, fuel provided by the stack reformer is burned in the burner with air which is drawn to the burner during the start-up phase of operation. The resultant heated air is then introduced into the stack through the cooling/heating loop where it heats the air being recirculated. This introduction of the heated air occurs upstream of a blower which is situated in the loop and used for forcing recirculation.

The aforesaid preheating arrangement, while usable, has certain drawbacks which, if overcome, would quicken start-up, as well as provide other system benefits. More particularly, with the described heating arrangement, the stack preheating temperature is limited by the temperature constraints of the blower material and the blower electronics since these are subjected to and, thus, must be able to withstand the temperature of the heated air. Typically, blowers for this application are designed to accommodate temperatures of below 500° F., thereby limiting the temperature of the heated air to this level. Higher temperatures, however, would enable faster start-up, but with the existing system could be realized only at significant expense of increasing the temperature characteristcs of the blowers used.

The inability to increase start-up time with the above preheating arrangement also leads to greater thermal and electrical requirements for the power plant. This is due to the fact that about one-third of the air in the cooling/heating loop is exhausted, so that longer start-up times result in increased amount of exhausted air as well as increased amounts of flue from the stack reformer, both of which constitute thermal energy loss.

Other drawbacks of the preheating arrangement involve the need to insulate the burner in order to avoid thermal signature and the need to use higher temperature burner materials capable of withstanding wall temperatures in the range of about 2500° F. The external burner is also noisy as a result of flame hydrodynamics.

It is therefore a primary object of the present invention to provide an apparatus for fuel cell power plant start-up which substantially avoids the drawbacks of the abovedescribed arrangement.

It is a further object of the present invention to provide an apparatus for fuel cell power plant start-up which enables a more rapid start-up.

It is yet a further object of the present invention to provide an apparatus for fuel cell power plant start-up which decouples start-up time from blower characteristcs, and which also suppresses burner thermal signature, dampens blower noise and reduces energy consumption during start-up.

SUMMARY OF THE INVENTION

In accordance with the principles of the present invention, the above and other objectives are realized in an apparatus in which a burner is placed within the stack cooling/heating loop downstream of the blower and in which the entry port for replenishing gas to the cooling/heating loop is situated in the loop upstream of the blower.

During start-up, the burner is supplied with fuel which it burns with a portion of the gas in the loop passing through the burner. Heated gas from the burner is thereby provided to the remaining gas in the loop, whereby the remaining gas is heated to the temperature desired for preheating of the fuel cell stack.

With this configuration for the apparatus, since the blower is upstream of the burner, it no longer is exposed to the gas in the loop immediately after the gas has been heated for start-up. As a result, the temperature of the heated gas can be significantly increased to thereby achieve a more rapid start-up. Furthermore, by situating the burner within the loop, the outer walls of the burner are exposed to a portion of the cooler loop gas prior to its being heated. This lessens the temperature requirements of the burner wall. The burner noise is also dampened and its thermal signature suppressed by its location within the loop.

Also, by positioning the blower upstream of the burner and downstream of the entry port for the replenishing gas the blower is subjected to substantially the coldest temperature in the loop, thereby greatly extending blower life.

BRIEF DESCRIPTION OF THE DRAWINGS

The above and other features and aspects of the present invention will become more apparent upon reading the following detailed description in conjunction with the accompanying drawing in which the sole FIGURE illustrates an apparatus in accordance with the principles of the present invention.

DETAILED DESCRIPTION

In the FIGURE, apparatus 1 in accordance with the principles of the present invention is shown. The apparatus 1 includes a fuel cell stack 2 having cooling/heating channels 2A or carrying cooling/heating gas 3 which, typically, might be air, through the stack during normal operation.

A recirculation loop 4 comprised of conduits 4a, 4b, 4c, 4d and 4e recirculates a portion of the cooling heating gas back to the stack 2. The remaining portion of the gas is exhausted through an exhaust port 5 in the conduit 4b. A gas entry port 15 in the conduit 4e enables replenishment of the gas exhausted from the loop. A blower 16 situated in the loop forces recirculation of the cooling/heating gas as well as entry of replenishing gas through port 15.

Entry and exit manifolds 6 and 7 for the cooling/heating gas connect the cooling channels 2a to the conduits 4e and 4a. Further manifolds 8 and 9 provide entry and exit manifolds for the fuel process gas channels 11 of the stack. Likewise, manifolds 12 and 13 provide entry and exit manifolds for the oxidant process gas channels 14 of the stack.

In accordance with the principles of the present invention, the apparatus 1 is further adapted to permit rapid start-up of the stack, while doing so in a manner to extend the life of the blower 16. More particularly, a burner 17, shown as a tubular member, is situated within the loop 4 at the downstream end of the blower 16, while the entry port 15 for replenishing gas to loop 4 is situated at the upstream end of the blower.

The burner 17 is shown concentrically arranged in conduit 4e and as having an input end 17a which receives a portion 3a of the gas 3 in the loop 4. The remaining portion 3b of the gas 3 passes along the outer walls of the burner to be combined with the gas exiting its output end 17b. The input end 17a of the burner is also fed from a conduit 18 passing through the wall of the burner and through conduit 4e. The conduit 18 connects through a valve 19 and through a further conduit 21 to the fuel supply 22. The supply 22 also feeds the fuel process gas channels 11 through conduit 23, valve 24, conduit 25 and manifold 8. Oxidant, in turn, is supplied to the manifold 12 via conduit 31, valve 32 and conduit 33 which couple to the loop conduit 4e downstream of the blower 16.

During start-up of the fuel cell stack, the valves 24 and 32 are closed and the valve 19 is opened. This inhibits fuel and oxidant from entering the stack, while it simultaneously enables fuel to be delivered to the input end 17a of the burner 17 along with the portion 3a of the oxidant gas in the loop 4. In the burner, these gases are burned so that heated exhaust gas is available at the burner output 17b to heat the portion of the gas 3b passing outside the burner. The heated gas 3b' then enters the stack to bring the stack up to the desired operating temperature. When this temperature is reached, the valve 19 is closed and the valves 24 and 32 opened. The burner, therefore, ceases producing heated gas and the gas in the loop then acts to cool the stack which is now in its normal operating mode.

With the apparatus 1, the heated gas entering the stack 2 during start-up can be made higher than in prior art designs, because the burner is upstream of the blower. This prevents the heated gas 3b' from being impressed upon the blower, thereby decoupling the temperature of the heated gas from the temperature constraints of the blower. Accordingly, the temperature of the heated gas can be of the order of about 650° F., wherein in prior designs such temperature was limited by blower constraints to about 400° F.

Furthermore, with the apparatus 1 the temperature to which the blower is subjected is additionally reduced, since the blower is downstream of the entry port 15 and, thus, gas in the loop is cooled before arriving at the blower by the replenishing gas (usually, this gas is at room temperature, i.e., at about 70° F.). As a result, where the temperature of the gas in the loop is of the order of 300° F., the temperature of the gas is reduced to below 250° F. by the gas from the entry port. The blower is thus subjected to temperatures which are about 150° F. below the 400° F. temperatures usually encountered in prior designs. The apparatus 1 thus enables quicker start-up, while extending blower life.

The presence of the burner within the cooling/heating loop is further advantageous in that the walls of the burner are cooled by the gas 3b during start-up. As a result, the temperature requirements of the burner walls are lessened and, hence, more easily satisfied. Moreover, the location of the burner within the loop suppresses the thermal signature of the burner and dampens the burner noise.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention. Thus, while the invention has been illustrated with the cooling/heating channels 2b being transverse to and fed by a separate manifold than the process gas channels, other configurations and relationships may be used. For example, the cooling/heating gas channels and the oxidant gas channel could be in the same direction and fed by a common manifold as disclosed in U.S. Pat. No. 4,192,906, assigned to the same assignee hereof. Furthermore, the loop where the blower and burner are situated need not be a cooling/heating type loop, but could also be a recirculation loop for one of the process gases.

What is claimed is:

1. Apparatus comprising:
    a fuel cell stack including passage means having entry and exit ends, said passage means carrying a gas through the stack from said entry to said exit end;
    loop means for recirculating a portion of the gas leaving said exit end back to said entry end;
    blower means within said loop for driving said recirculation;
    burner means within said loop downstream of said blower means, said burner means being adapted to receive a portion of the gas in said loop and being further adapted to receive fuel from a fuel supply during start-up of said fuel cell stack;
    and an entry port in said loop means disposed upstream of said blower, for replenishing gas to said loop.

2. Apparatus in accordance with claim 1 wherein:
    said entry and exit ends include entry and exit manifolds, respectively;
    said loop means includes a conduit connecting said entry and exit manifolds.

3. Apparatus in accordance with claim 2 further comprising:
    means for coupling fuel from said fuel supply to said burner during start-up.

4. Apparatus in accordance with claim 3 wherein:
    said coupling means comprises a valve assembly and a duct connecting said valve assembly to said burner.

5. Apparatus in accordance with claim 4 wherein:
    said fuel cell stack includes oxidant and fuel process gas channels; and first and second manifolds for coupling oxidant and fuel gas, respectively to said oxidant and fuel process gas channels.

6. Apparatus in accordance with claim 5 wherein:
    said valve assembly conveys fuel to said second manifold and ceases to convey fuel to said burner subsequent to start-up of said fuel cell stack.

7. Apparatus in accordance with claim 2 wherein:
    said burner comprises a tubular member arranged in said conduit, said tubular member having input and output ends, said portion of said gas in said loop being introduced into said input end of said burner and the remaining gas passing around said tubular member and being combined with the gas exiting said exit end of said tubular member.

8. Apparatus in accordance with claim 7 wherein:
    said tubular member is concentrically arranged in said conduit.

* * * * *